Patented Jan. 28, 1930

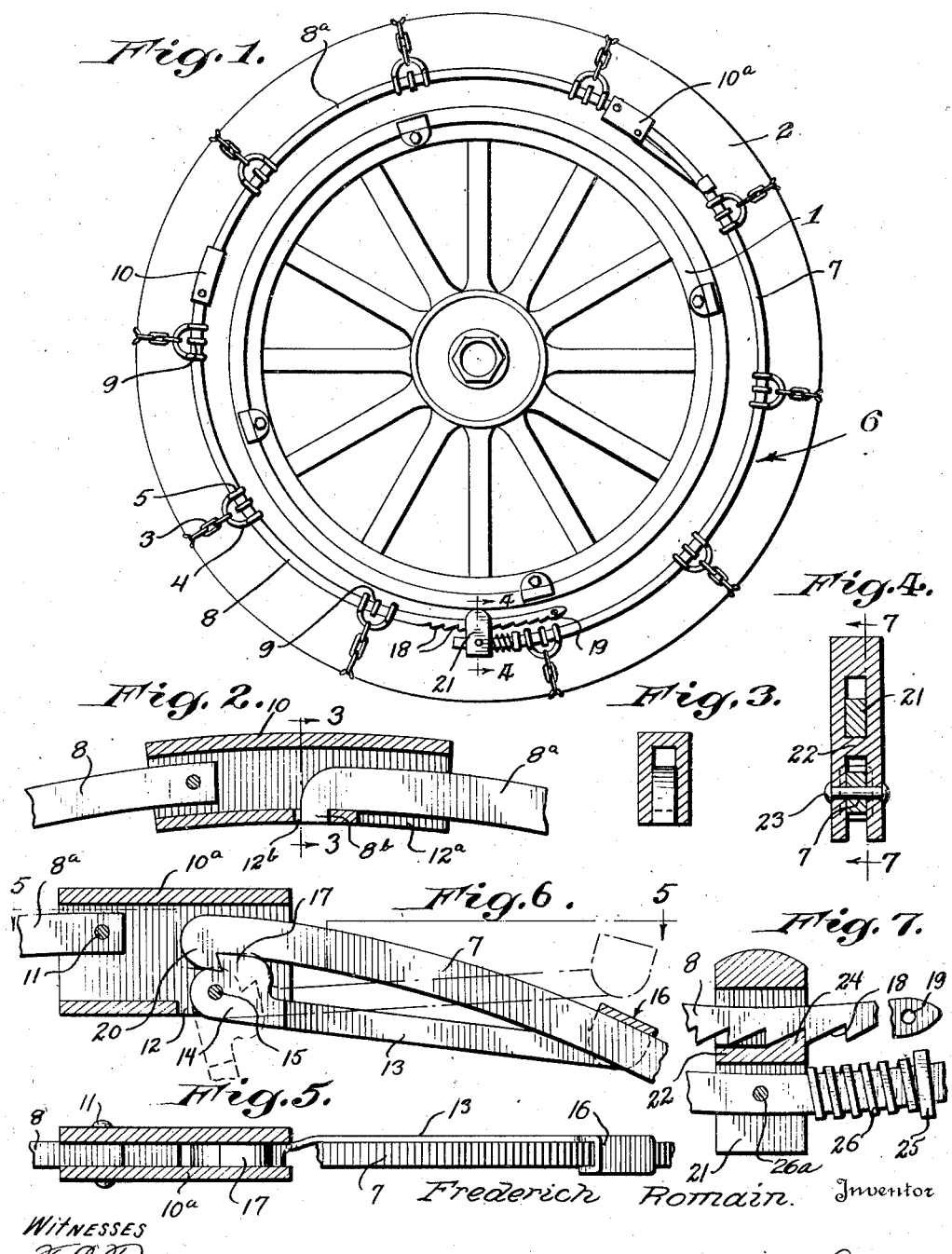

1,745,273

UNITED STATES PATENT OFFICE

FREDERICH ROMAIN, OF MARIAS, MONTANA

TIRE AND MUD CHAIN

Application filed July 5, 1927. Serial No. 203,568.

This invention relates to anti-skid chain attachments for pneumatic or other types of vehicle wheels, and pertains patricularly to a device of this character adapted to be expeditiously applied without the necessity of moving the wheel or jacking the same up from the ground. Another object of the invention, is to provide, in a manner as hereinafter set forth, an anti-skid device having an improved means for maintaining the cross chains thereof in position upon a tire.

Another object of this invention is to provide a tire and mud chain so constructed that an automatic tightening effect will take place during the rotation of the wheels upon which the device is mounted to take up the looseness of the structure and compensate for wear of the same.

Another object of the invention is to provide, in a manner as hereinafter set forth, an anti-skid chain having an improved automatic locking feature which facilitates the application of the device to a wheel without loss of time.

Still another object of the invention is to provide, in a manner as hereinafter set forth, an anti-skid device of strong and durable construction, easy to manipulate and comparatively inexpensive to manufacture.

Numerous other objects and advantages of the present invention will become apparent as the description of the same proceeds and the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 shows a vehicle wheel carrying a pneumatic tire, in side elevation, showing the anti-skid device embodying the present invention applied thereto.

Figure 2 is a detailed view showing the manner in which a pair of the cross chain connecting bars are secured together at one end.

Figure 3 is a section taken substantially upon the line 3—3 of Figure 2.

Figure 4 is a section taken upon the line 4—4 of Figure 1, and

Figure 5 is a section taken substantially upon the line 5—5 of Figure 6.

Figure 6 is a detail view showing another connection between a pair of the chain connecting bars.

Figure 7 is a section taken substantially upon the line 7—7 of Figure 4.

Referring now to the drawing in detail, wherein like numerals of reference indicate corresponding parts throughout the several views, the numeral 1 indicates generally a vehicle wheel of the usual construction, carrying the usual pneumatic tire 2.

One side of the structure embodying the present invention is shown in Figure 1, a duplicate of this structure being positioned at the opposite side of the tire as will be readily understood. Since the structure at the opposite sides of the tire are the same, the description will be confined to the members shown, with the understanding that like members are employed on the opposite sides.

In association with a plurality of cross chains 3 which may be of the usual construction, there is used a plurality of substantially U-shaped link members 4 which connect to the ends of the cross chains and which have each leg thereof provided with an eye 5.

The cross chains 3 are held in position by a three-part spring steel ring indicated as a whole by the numeral 6, which ring is made up of the sections 7, 8 and 8ª. Each of these sections describes substantially one-third of a circle and when in connected relation, as shown, form a ring of materially smaller diameter than the over-all diameter of the tire 2, the ring when in operative position being arranged adjacent the central portion of the side wall of the tire. Each of the sections 7, 8 and 8ª passes through the aligned eyes 5 of the plurality of U-shaped links 4 in the manner shown and each section has formed integral therewith a plurality of stops or lugs 9 each of which is positioned between the two legs of a link member 4. From this it will be understood that the cross chains and U-shaped links which connect them to the bars or sections 7, 8 and 8ᵃ are prevented from creeping about the tire upon their respective ring sections.

The ring sections 8 and 8ᵃ each has one end secured in a box-like member, which boxes are indicated by the numerals 10 and 10ᵃ and as shown in Figures 2 and 6, each of these members is open at its ends for the purpose described. The ends of the sections 8 and 8ᵃ are pivotally maintained in position in their respective box members by pins or rivets 11 which pass therethrough and through side walls of the boxes as shown.

The lower edge of the box 10ᵃ is cut away as at 12 and pivotally mounted between the side walls adjacent this cut-away portion is a locking lever indicated as a whole by the numeral 13. This locking lever has the head portion 14 positioned within the box 10 and traversed by the retaining pin 15 which secures the locking lever in the desired position. The outer end of the lever member is provided with a clip 16 which is of substantially U-shaped cross sectional design while the head end 14 is formed upon its inner edge to set up the tooth 17 for the purpose about to be described.

The box member 10 has the wall of the lower edge thereof at the end remote from the end into which the section 8 extends cut out as indicated at 12ᵃ and further has formed therethrough inwardly of the cut out portion, the aperture 12ᵇ. The other end of the ring section 8ᵃ is formed to provide an inturned hook 8ᵇ and this hooked end is designed to be extended into the slotted end of the box member 10 for engagement in the aperture 12ᵇ when the attached sections are swung apart in the formation of the ring.

The other end of the ring section 8 has its outer edge provided with a plurality of notches 18 and adjacent the terminus of this section is formed an aperture 19.

The ring section 7 has one end formed to set up on the concave edge face, the hook or bill 20 which bill is adapted to be extended into the open end of the box 10ᵃ opposite the end in which the section 8ᵃ extends, for engagement by the tooth 17 of the locking lever 13. The opposite end of the ring section 7 extends between the free ends of the legs of a substantially U-shaped member 21 beneath a cross connecting bar portion 22 which extends between the legs of this member. This end of the section 7 is preferably riveted between the end of the legs of the member 21 as indicated at 23 and the upper surface of the cross connecting portion 22 of this U-shaped member is formed at one edge to set up the tooth 24 designed to engage in one of the notches 18 of the opposite section 8. The ring section 7 adjacent the member 21 is provided with the collar 25 and surrounding the member 7 between the collar and the member 21 is a coil spring 26 which bears at one end against the collar 25 and the other end against the member 21 as is clearly shown in Figure 7 to yieldably hold the member 21 against swinging movement upon the pin 26ᵃ and thereby assist in holding the tooth 24 in engagement with the notch 18.

In assembling the anti-skid structure above described, a pair of the sections, for example, the sections 8 and 8ᵃ can be connected as above described and covering substantially two-thirds of the same after which the other two ring sections may be applied extending the notched end of the section 8 through the member 21 and extending the hooked head portion 20 of the member 7 into the box 10ᵃ. It will be, of course, understood that the locking lever 13 will at this time be swung to a position at right angles or substantially so, to the edge of the box 10ᵃ in which the recess 12 is formed, thus bringing the bill 17 somewhat closer to the adjacent open end of the box. When the section 7 and the connected sections 8 and 8ᵃ are drawn inwardly as closely as possible to form the complete ring 6, the locking lever 13 is swung upwardly causing the hook 17 to engage the hook 20 of the adjacent ring section and thus drawing this particular ring section tightly inwardly toward the center of the wheel, consequently decreasing the diameter of the ring 6 and tightening the cross chains 3 across the wheel tread. The tongue member 16 is swung between the ring section 11 and the tire to a position above the ring section whereupon it is moved outwardly in such manner as to permit its engagement over the ring section when swung slightly in the reverse direction, as will be readily understood from the showing of Figure 6.

From the foregoing description it will be readily understood that with an anti-skid device of this character, no difficulty whatever will be experienced in extricating oneself from a bad section of ground in which the machine may have been run without chains on the wheels as this device can be readily applied in bad ground without the necessity of jacking up the wheels as is necessary when using other types of anti-skid chains, and it will also be understood that the chain structure may be left loose at first if necessary as it will automatically become tightened when the wheels are rotated.

Having thus described my invention, what I claim is:

1. A vehicle tire chain of the character described, comprising a pair of ring members designed to be positioned upon opposite sides of a tire and each divided into three sections, cross chains connecting the sections of one ring with the sections of the other ring, a casing carried upon one end of each of two ring sections, means for receiving and locking one end of one ring section in an adjacent casing, means associated with the other of said casings for receiving one end of an adjacent ring section and drawing the same to locked position, and means for setting up a sliding locking connection between one end of one of said casing carrying sections and an end of the third section whereby the circumference of said rings will be automatically reduced upon the rotation of the wheel carrying the structure, to lock the same in position.

2. In a vehicle tire chain structure of the character described, a pair of ring members designed to be positioned upon opposite sides of a tire and each divided into three sections, a box member carried upon one end of each of two or said sections, means for engaging the other end of one of said two sections in the box member of the other portion, swinging locking means carried by said other box member for securing one end of the third ring section thereto, a keeper member carried upon the other end of said third section and means for receiving into said keeper member the free end of one of said two sections to form the completed ring.

3. In a vehicle tire chain structure of the character described, a pair of ring members designed to be positioned upon opposite sides of a tire and each divided into three sections, a box member carried upon one end of each of two of said sections, means for engaging the other end of one of said two sections in the box member of the other section, swinging locking means carried by said other box member for securing one end of the third ring section thereto, a keeper member carried upon the other end of said third section and means for receiving into said keeper member the free end of one of said two sections to form the completed ring, said keeper member and the section engaged thereby being relatively movable in one direction upon rotation of the wheel carrying the device.

In testimony whereof I affix my signature.

FREDERICH ROMAIN.